US012174369B2

(12) United States Patent
Kuribayashi

(10) Patent No.: US 12,174,369 B2
(45) Date of Patent: Dec. 24, 2024

(54) OPTICAL SCANNING DEVICE FOR AN IMAGE FORMING DEVICE

(71) Applicant: TOSHIBA TEC KABUSHIKI KAISHA, Tokyo (JP)

(72) Inventor: Yasushi Kuribayashi, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 711 days.

(21) Appl. No.: 17/463,722

(22) Filed: Sep. 1, 2021

(65) Prior Publication Data

US 2023/0063080 A1    Mar. 2, 2023

(51) Int. Cl.
*G02B 26/12*    (2006.01)
*H04N 1/03*    (2006.01)
*G03G 15/04*    (2006.01)

(52) U.S. Cl.
CPC ............ *G02B 26/127* (2013.01); *H04N 1/03* (2013.01); *G02B 26/129* (2013.01); *G03G 15/04072* (2013.01)

(58) Field of Classification Search
None
See application file for complete search history.

(56) References Cited

U.S. PATENT DOCUMENTS

| 6,052,211 A * | 4/2000 | Nakajima | H04N 1/506 359/201.1 |
| 2004/0114029 A1* | 6/2004 | Bang | B41J 2/471 347/258 |
| 2016/0282749 A1* | 9/2016 | Yokoi | G03G 15/04072 |

FOREIGN PATENT DOCUMENTS

| JP | H1155472 A | 2/1999 |
| JP | 2000-147396 A | 5/2000 |
| JP | 2004-287077 A | 10/2004 |
| JP | 2005-062712 A | 3/2005 |
| JP | 2005-062714 A | 3/2005 |
| JP | 2010-262244 A | 11/2010 |

\* cited by examiner

*Primary Examiner* — Jennifer D. Carruth
(74) *Attorney, Agent, or Firm* — FOLEY & LARDNER LLP

(57) ABSTRACT

An optical scanning device includes a light source, a photodetector, an optical element group, and a polygon mirror. The light source is configured to emit laser light. The photodetector is configured to detect a beam formed with the laser light. The optical element group is configured to guide the beam to the photodetector. The polygon mirror is configured to perform deflection scanning on the beam, which deflects the beam from a first end in one direction of a main scanning direction to a second end on a side opposite to the first end of the main scanning direction. The beam is incident on the same side of the photodetector when the beam is deflected toward the first end and the second end by the polygon mirror.

20 Claims, 8 Drawing Sheets

OPTICAL SCANNING DEVICE FOR AN IMAGE FORMING DEVICE

FIELD

Exemplary embodiments described herein relate to an optical scanning device.

BACKGROUND

An electrophotographic image forming device deflects light beams (beams) to form an electrostatic latent image on a photoconductor. The image forming device includes an optical scanning device that deflects a plurality of beams. The optical scanning device includes, for example, a photodetector that detects a plurality of beams. The optical scanning device adjusts the synchronization of the beams based on the detection result of a photodetector of a beam at the start of image writing and a beam at the end of the image writing. Therefore, the optical scanning device is required to be able to detect beams appropriately.

DETAILED DESCRIPTION

In general, according to one embodiment, an optical scanning device is provided in an image forming device and deflects light in a main scanning direction along a rotation axis of a photoconductor, which includes a light source, a photodetector, an optical element group, and a polygon mirror. The light source emits laser light. The photodetector detects a beam formed with the laser light. The optical element group guides the beam to the photodetector. The polygon mirror performs deflection scanning on the beam from one end in one direction of the main scanning direction to the other end on a side opposite to the one end. The beam applied to the one end is incident on the photodetector from a side on which the beam applied to the other end is incident on the photodetector.

Hereinafter, an embodiment is described with reference to the drawings.

Figure 1:
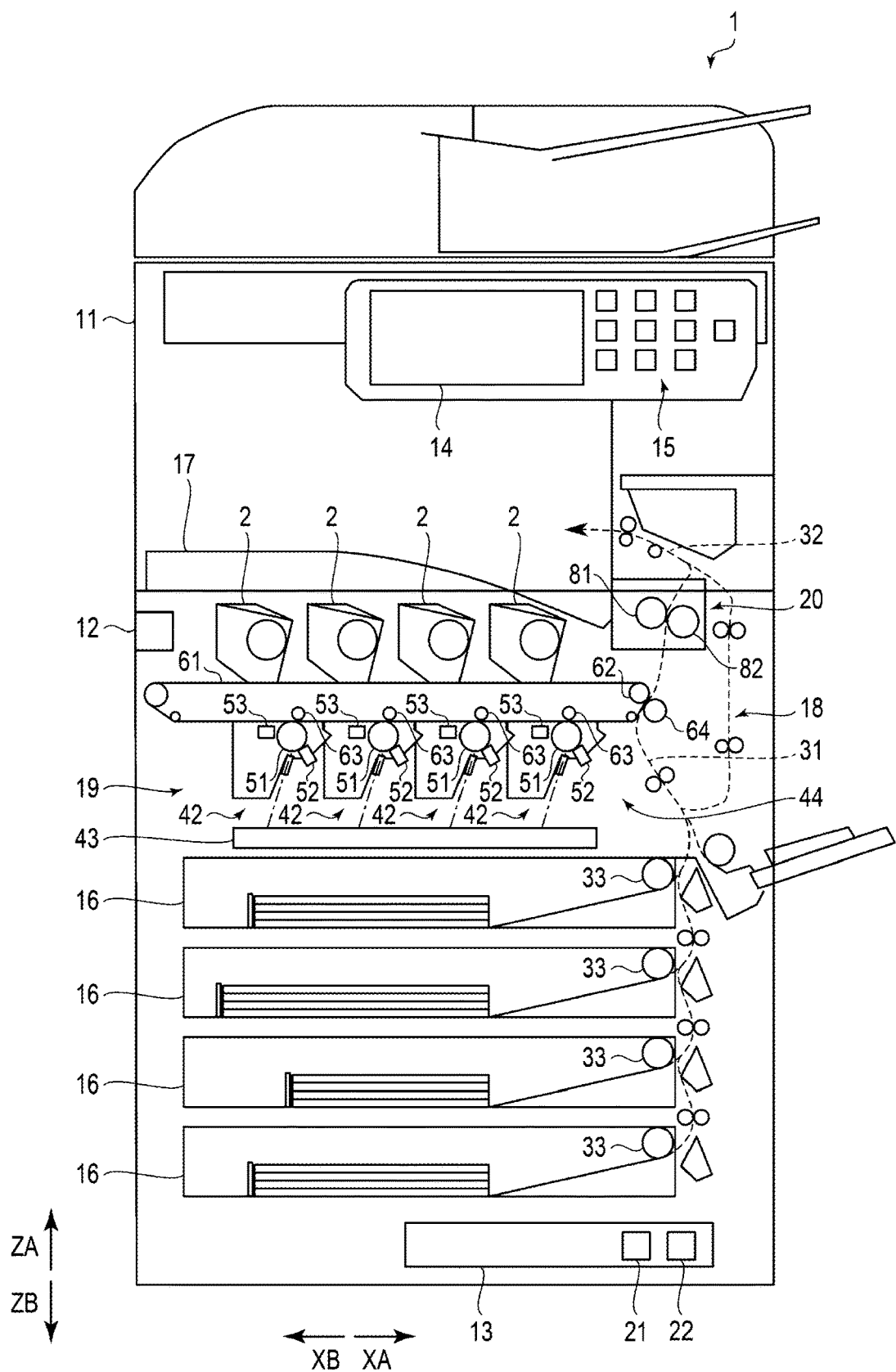
FIG. 1 is a schematic view illustrating an image forming device including an optical scanning device according to an embodiment.

FIG. 1 is a schematic view illustrating an image forming device including an optical scanning device according to an embodiment. An image forming device 1 is, for example, a multifunction printer (MFP) that performs various processes such as image forming while conveying a recording medium. The image forming device 1 forms an image on the recording medium by using a toner supplied from a toner cartridge 2. For example, the image forming device 1 receives a toner from the toner cartridge 2 and forms an image on the recording medium with the received toner. The image forming device 1 receives toners from a plurality of the toner cartridges 2 that store toners, for example, of different colors of cyan, magenta, yellow, and black, and forms toner images. In the image forming device 1, vertical directions in the gravity direction (directions indicated by an arrow ZA and an arrow ZB), width directions intersecting (orthogonal or substantially orthogonal) to the vertical directions (directions indicated by an arrow XA and an arrow XB), and depth directions intersecting (orthogonal or substantially orthogonal) to the both of the vertical directions and the width directions are defined.

As illustrated in FIG. 1, the image forming device 1 includes a housing 11, a communication interface 12, a system controller 13, a display unit 14 (a display), an operation interface 15, a paper feed cassette 16, a paper ejection tray 17, a conveyance mechanism 18 (a conveyor), an image forming unit 19 (a printer assembly), and a fixing device 20.

The housing 11 is a main body of the image forming device. The housing 11 accommodates the communication interface 12, the system controller 13, the display unit 14, the operation interface 15, the paper feed cassette 16, the paper ejection tray 17, the conveyance mechanism 18, the image forming unit 19, and the fixing device 20.

The communication interface 12 is an interface that relays communication with other devices. The communication interface 12 is used, for example, for communication with a client. The client is an information processing device such as a personal computer, a smartphone, or a tablet PC. The communication interface 12 may wirelessly communicate with the client according to a standard such as Bluetooth (Registered Trademark) or Wi-Fi (Registered Trademark).

The system controller 13 controls the image forming device 1. The system controller 13 includes, for example, a processor 21 and a memory 22. The processor 21 is a calculation element that performs a calculation process. The processor 21 is, for example, a central processing unit (CPU). The processor 21 performs a process based on data such as a program stored in the memory 22. The processor 21 executes a program stored in the memory 22 to function as a control unit that can perform various operations. The memory 22 is a storage medium that stores a program, data used in the program, and the like. The memory 22 functions as a working memory. That is, the memory 22 temporarily stores data during the process of the processor 21, a program executed by the processor 21, and the like.

The processor 21 controls, for example, transmission and reception of data by the communication interface 12, a screen display by the display unit 14, an operation input by the operation interface 15, conveyance of a recording medium by the conveyance mechanism 18, an image forming process by the image forming unit 19, and a fixing process by the fixing device 20. The processor 21 generates a print job based on an image acquired from an external device via the communication interface 12. The processor 21 stores the generated print job in the memory 22. The print job includes image data indicating an image to be formed on the recording medium. The image data may be data for forming an image on one recording medium or may be data for forming images on a plurality of recording media. The print job includes information indicating color printing or monochrome printing.

The processor 21 executes a program stored in the memory 22 to function as a controller (engine controller) that controls operations of the conveyance mechanism 18, the image forming unit 19, and the fixing device 20. That is, the processor 21 controls the conveyance of the recording medium by the conveyance mechanism 18. The processor 21 controls the formation of an image on the recording medium by the image forming unit 19. The processor 21 controls the fixation of the image to the recording medium by the fixing device 20.

The image forming device 1 may include an engine controller separately from the system controller 13. For example, the image forming device 1 may include engine controllers corresponding to the conveyance mechanism 18, the image forming unit 19, and the fixing device 20, respectively. That is, the image forming device 1 may include an engine controller that controls the conveyance of the recording medium by the conveyance mechanism 18, an engine controller that controls the formation of an image on the recording medium by the image forming unit 19, and an engine controller that controls the fixation of the image to the recording medium by the fixing device 20. In this case, the system controller 13 supplies information required for the control of the engine controllers to the engine controllers.

The display unit 14 includes a display that displays a screen in response to an input moving image signal. A screen for various settings of the image forming device 1 and the like are displayed on the display of the display unit 14. The operation interface 15 includes an operation member that generates an operation signal based on an operation of the user. The paper feed cassette 16 is a cassette that accommodates a recording medium. The paper feed cassette 16 can supply a recording medium from the outside of the housing 11. For example, the paper feed cassette 16 can be extracted from the housing 11. The paper ejection tray 17 is a tray that supports a recording medium discharged from the image forming device 1.

The conveyance mechanism 18 supplies the recording medium for printing to the image forming unit 19 and also discharges the recording medium on which the image is formed by the image forming unit 19 from the housing 11. The conveyance mechanism 18 includes a paper feed conveyance path 31 and a paper ejection conveyance path 32. Each of the paper feed conveyance path 31 and the paper ejection conveyance path 32 makes the recording medium move. The paper feed conveyance path 31 takes in the recording medium from the paper feed cassette 16 and supplies the taken recording medium to the image forming unit 19. The paper feed conveyance path 31 includes a pickup roller 33 corresponding to the paper feed cassette 16. The pickup roller 33 takes in the recording medium of the paper feed cassette 16 to the paper feed conveyance path 31. The paper ejection conveyance path 32 is a conveyance path through which the recording medium on which the image is formed is discharged from the housing 11. The paper ejection tray 17 supports the recording medium discharged by the paper ejection conveyance path 32.

The image forming unit 19 forms the image on the recording medium. The image forming unit 19 forms the image on the recording medium, for example, based on the print job generated by the processor 21. The image forming unit 19 includes a plurality of process units 42, a plurality of optical scanning devices 43, and a transfer mechanism 44. The process units 42 are provided for each kind of toner. For example, the plurality of process units 42 are process units for color toners of cyan, magenta, yellow, black, and the like, respectively. The toner cartridges 2 including toners of different colors are connected to the plurality of process units 42, respectively. The plurality of process units 42 have the same configuration, and thus one process unit 42 is described.

The process unit 42 includes a photosensitive drum 51, a charging charger 52, and a developing device 53. The photosensitive drum 51 is a photoconductor that includes a cylindrical drum and a photosensitive layer provided on the outer peripheral surface of the drum. The photosensitive drum 51 rotates at a constant speed. The charging charger 52 uniformly charges the surface of the photosensitive drum 51. The charging charger 52 uniformly charges the photosensitive drum 51 to a negative potential by applying a voltage to the photosensitive drum 51. The developing device 53 attaches the toners to the photosensitive drum 51. The developing device 53 includes a developer container, a stirring mechanism, a developing roller, a doctor blade, and the like.

The developer containers are containers that receive and contain the toners sent from the toner cartridges 2. Carriers are contained in the developer containers in advance. The stirring mechanisms mix the toners sent from the toner cartridges 2 and the carrier. The mixtures become developers. The carriers are contained in the developer container, for example, when the developing devices 53 are manufactured. By the rotation of the developing rollers in the developer containers, the developers are attached to the surfaces of the developing rollers. The doctor blades are disposed to be separated from the surfaces of the developing rollers. The doctor blades remove a portion of the developers attached to the surfaces of the rotating developing rollers. Accordingly, the layers of the developers are formed on the surfaces of the developing rollers. The thickness of the layer of the developer is a thickness in response to the distance between the doctor blade and the surface of the developing roller.

The optical scanning devices 43 are electrophotographic optical scanning devices, for example, using Laser Scanning Units (LSU). The optical scanning devices 43 output laser light in response to the image to be printed and irradiate the charged photosensitive drums 51 of the process units 42 with laser light. The optical scanning devices 43 deflect laser light in the main scanning direction that is a direction along the rotation axis of the photosensitive drum 51. Accordingly, the optical scanning device 43 forms an electrostatic latent image for one line on the photosensitive drum 51. The optical scanning device 43 continuously irradiates the rotating photosensitive drum 51 with light, to form an electrostatic latent image of a plurality of lines on the photosensitive drum 51. In this state, if the layer of the developer formed on the surface of the developing roller of the developing device 53 goes closer to the surface of the photosensitive drum 51, the toner included in the developer is attached to the electrostatic latent image formed on the surface of the photosensitive drum 51. Accordingly, the toner image is formed on the surface of the photosensitive drum 51. The detailed configuration of the optical scanning device 43 is described below.

The transfer mechanism 44 has a configuration of transferring the toner image formed on the surface of the photosensitive drum 51 to the recording medium. The transfer mechanism 44 includes, for example, a primary transfer belt 61, a secondary transfer facing roller 62, a plurality of primary transfer rollers 63, and a secondary transfer roller 64. The primary transfer belt 61 is an endless belt that is wound around the secondary transfer facing roller 62 and a plurality of winding rollers. With respect to the primary transfer belt 61, the inner peripheral surface that is the inner surface is in contact with the secondary transfer facing roller 62 and the plurality of winding rollers, and the outer peripheral surface that is the outer surface faces the photosensitive drums 51 of the process units 42.

The secondary transfer facing roller 62 conveys the primary transfer belt 61 in the predetermined conveyance direction by rotation. The plurality of winding rollers are freely rotatably configured. The plurality of winding rollers rotate along the movement of the primary transfer belt 61 by the secondary transfer facing roller 62.

The plurality of primary transfer rollers 63 are configured to cause the primary transfer belt 61 to be in contact with the photosensitive drums 51 of the plurality of process units 42 respectively. The plurality of primary transfer rollers 63 are provided to correspond to the photosensitive drums 51 of the plurality of process units 42. Specifically, the plurality of primary transfer rollers 63 are provided at the positions facing the corresponding photosensitive drums 51 of the process units 42 with the primary transfer belt 61 sandwiched therebetween. The primary transfer rollers 63 are in contact with the inner peripheral surface side of the primary transfer belt 61 and displace the primary transfer belt 61 to the photosensitive drums 51 side. Accordingly, the primary transfer rollers 63 cause the outer peripheral surface of the primary transfer belt 61 to be in contact with the photosensitive drums 51.

The secondary transfer roller 64 is provided at a position of facing the primary transfer belt 61. The secondary transfer roller 64 is in contact with the outer peripheral surface of the primary transfer belt 61 and applies pressure. Accordingly, a transfer nip at which the secondary transfer roller 64 and the outer peripheral surface of the primary transfer belt 61 are in close contact with each other is formed. When the recording medium passes through the transfer nip, the secondary transfer roller 64 presses the recording medium passing through the transfer nip against the outer peripheral surface of the primary transfer belt 61.

The secondary transfer roller 64 and the secondary transfer facing roller 62 rotate to convey the recording medium supplied from the paper feed cassette 16 by the conveyance mechanism 18 in a state of being sandwiched therebetween. Accordingly, the recording medium passes through the transfer nip.

In the configuration, if the outer peripheral surface of the primary transfer belt 61 is in contact with the photosensitive drums 51, the toner images formed on the surfaces of the photosensitive drums 51 are transferred to the outer peripheral surface of the primary transfer belt 61. If the image forming unit 19 includes the plurality of process units 42, the primary transfer belt 61 receives the toner images from the photosensitive drums 51 of the plurality of process units 42. The toner images transferred to the outer peripheral surface of the primary transfer belt 61 are conveyed to the transfer nip at which the secondary transfer roller 64 and the outer peripheral surface of the primary transfer belt 61 are in close contact with each other by the primary transfer belt 61. If the recording medium is present at the transfer nip, the toner image transferred to the outer peripheral surface of the primary transfer belt 61 is transferred to the recording medium at the transfer nip.

Subsequently, the configuration relating to the fixation of the image forming device 1 is described. The fixing device 20 melts the toner transferred to the recording medium and fixes the toner image. The fixing device 20 operates based on the control of the system controller 13. The fixing device 20 includes a heating member that applies heat to the recording medium and a pressurizing member that applies pressure to the recording medium. For example, the heating member is, for example, a heating roller 81. For example, the pressurizing member is a pressing roller 82.

The heating roller 81 is a rotating body for fixing by rotation. The heating roller 81 includes a core metal formed of hollow-shaped metal and an elastic layer formed on the outer periphery of the core metal. The heating roller 81 is heated to a high temperature by a heater disposed on the inner side of the core metal formed in a hollow shape. The heater is, for example, a halogen heater. The heater may be an induction heating (IH) heater that heats the core metal by electromagnetic induction.

The pressing roller 82 is provided at the position of facing the heating roller 81. The pressing roller 82 includes core metal formed of metal having a predetermined outer diameter and an elastic layer formed on the outer periphery of the core metal. The pressing roller 82 applies pressure to the heating roller 81. A fixing nip at which the pressing roller 82 and the heating roller 81 are in close contact with each other is formed by applying the pressure from the pressing roller 82 to the heating roller 81. The pressing roller 82 moves the recording medium introduced to the fixing nip by rotation and presses the recording medium against the heating roller 81.

According to the above configuration, the heating roller 81 and the pressing roller 82 apply heat and pressure to the recording medium that passes through the fixing nip. Accordingly, the toner image is fixed to the recording medium that passes through the fixing nip. The recording medium that passes through the fixing nip is discharged to the outside of the housing 11 by the conveyance mechanism 18. The fixing device 20 is not limited to the above configuration. The fixing device 20 may be configured by an on-demand method in which heat is applied to the recording medium to which the toner image is transferred via a film-shaped member so that the toner is melted and fixed.

Figure 2:
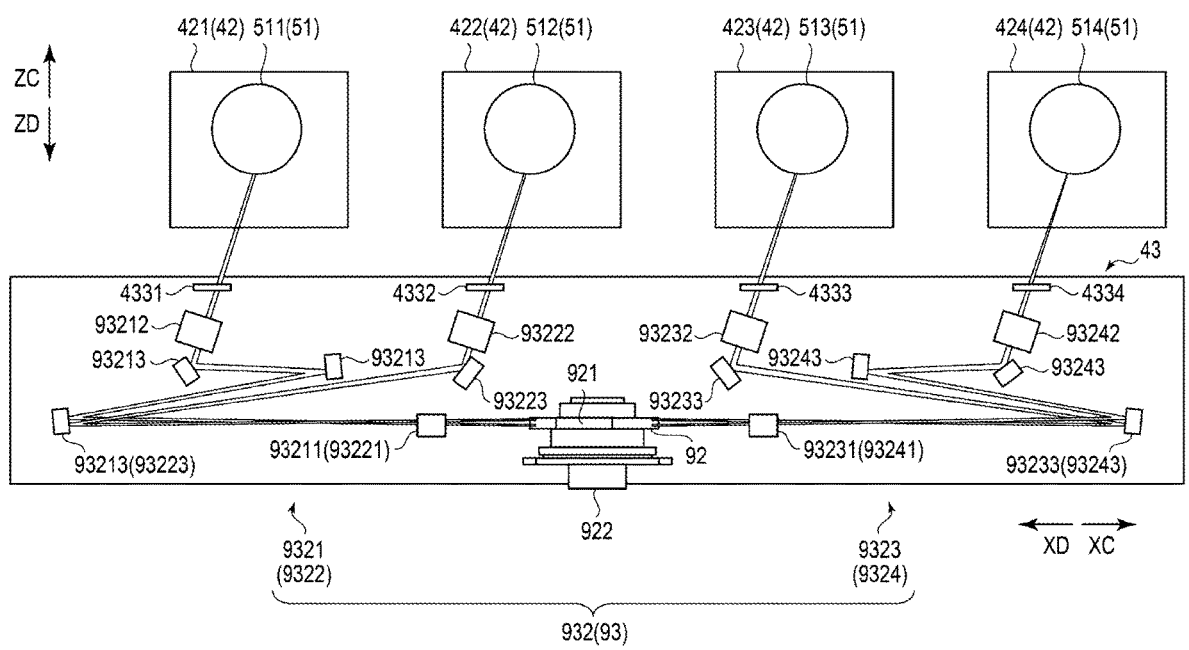
FIG. 2 is a schematic view illustrating the optical scanning device, as viewed from one side in a main scanning direction.

Subsequently, the optical scanning device 43 is specifically described. FIG. 2 is a schematic view illustrating the optical scanning device 43 as viewed from one side in the main scanning direction. FIG. 2 illustrates the plurality of process units 42 and the plurality of photosensitive drums 51, in addition to the optical scanning device 43. In the optical scanning device 43, height directions (directions indicated by an arrow ZC and an arrow ZD), first directions intersecting to the height direction (directions indicated by an arrow XC and an arrow XD), and the second directions intersecting to the both of the height directions and the first directions are defined. The optical scanning device 43 is provided in the image forming device 1 in a posture in which the height direction is along the vertical direction. At this point, the first directions are along the sub-scanning direction of the image forming device 1, and the second directions are along the main scanning direction of the image forming device 1.

The optical scanning device 43 corresponds, for example, to the Laser Scanning Unit (LSU). In the optical scanning device 43, a polygon mirror 92 described below is disposed in the center in the sub-scanning direction, and scanning optical element groups are disposed on the both sides of the polygon mirror 92 in the sub-scanning direction. In the example of FIG. 2, the plurality of process units 42 are disposed in an order of a yellow process unit 421, a magenta process unit 422, a cyan process unit 423, and a black process unit 424, from the side further from the transfer nip in the sub-scanning direction of the image forming device 1.

Figure 3:
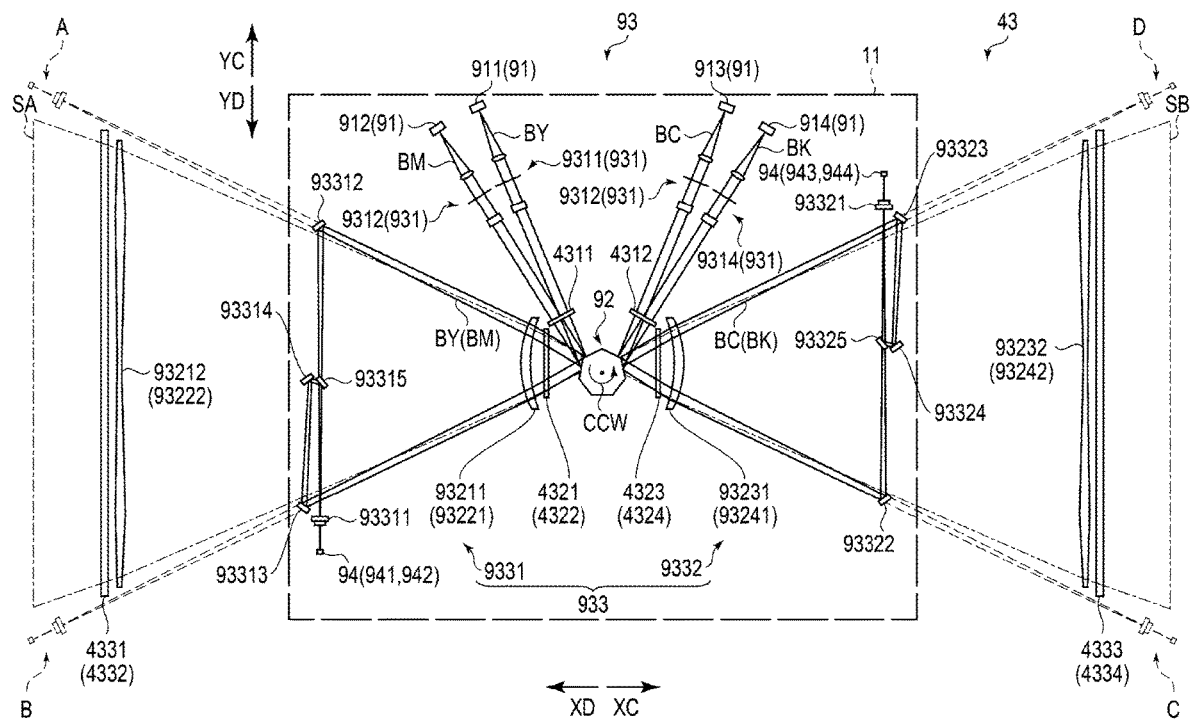
FIG. 3 is a schematic view illustrating the optical scanning device, as viewed from an upper side in a height direction, in a state in which an optical path by a scanning optical element group is unfolded.

FIG. 3 is a schematic view of the optical scanning device 43 as viewed from the upper side in the height direction. Also in FIG. 3, the height direction, the first directions (indicated by an arrow YC and an arrow YD) and second directions are defined in the same manner as in FIG. 2. Areas SA and SB are areas (image areas) that move by deflection scanning with laser light. In order to illustrate optical paths in case of not being bent by bending mirrors 93312 to 93315, and 93322 to 93325 described below, virtual positions A to D that are virtual positions of optical correction elements 93311 and 93321 and photodetectors 941 to 944 described below are illustrated with broken lines.

Here, in FIG. 3, scanning optical element groups 9321 to 9324 illustrated in FIG. 2 are unfolded. Therefore, bending mirrors 93213, 93223, 93233, and 93243 described below are omitted. Since the optical path lengths are the same, in FIG. 3, fθ lenses 93212 and 93222, fθ lenses 93232 and 93242, second cover glasses 4321 and 4322, second cover glasses 4323 and 4324, third cover glasses 4331 and 4332, and third cover glasses 4333 and 4334 described below are illustrated at the same positions, respectively.

As illustrated in FIG. 3, the optical scanning device 43 includes a plurality of laser light sources 91, the polygon mirror 92, a plurality of optical element groups 93, and the plurality of photodetectors 94.

The laser light sources 91 are light sources that output laser light. The laser light sources 91 are, for example, laser diodes. The laser light sources 91 are provided for each process unit 42. That is, the laser light sources 91 are provided for cyan, magenta, yellow, black, and the like, respectively. Therefore, as illustrated in FIG. 3, the laser light sources 91 include the yellow laser light source 911, the magenta laser light source 912, a cyan laser light source 913, and a black laser light source 914.

As illustrated in FIG. 2, the polygon mirror 92 is a rotating multifaceted mirror that includes a plurality of reflecting surfaces 921 that reflect the laser light output from the laser light sources 91 and rotates at a constant speed. The polygon mirror 92 is formed, for example, in a seven-sided columnar shape and provided with seven reflecting surfaces on the side surface. The polygon mirror 92 rotates by being rotationally driven by a driving mechanism 922 (actuator, motor, etc.). The polygon mirror 92 rotates about an axis of the central axis along the height direction. As illustrated in FIG. 3, the polygon mirror 92 is provided in the center or substantially the center of the optical scanning devices 43 in both of the main scanning direction and the sub-scanning direction. That is, the polygon mirror 92 is provided in the central portion of the optical scanning device 43. The polygon mirror 92 is rotatably driven about the central axis in the direction of an arrow CCW (counterclockwise direction when viewed from the upper side in the height direction) by the driving mechanism 922 described above. The rotation direction of the polygon mirror 92 is not limited to this.

Accordingly, angles of the reflecting surfaces 921 with respect to the incident direction of the laser light relatively change. The polygon mirror 92 rotates at a constant speed by the driving mechanism 922 and reflects the laser light output from the laser light sources 91 by the reflecting surfaces 921 to change the traveling direction of the laser light with time. Accordingly, the polygon mirror 92 performs deflection scanning on light (beams) BY, BM, BC, and BK emitted from the laser light sources 91 (911 to 914) in the main scanning direction on the photosensitive drums 511 to 514 of the process units 421 to 424, respectively. Explaining this with reference to FIG. 3, if the polygon mirror 92 rotates as described above, the beams BY and BM are subjected to the deflection scanning on the arrow YD side along the main scanning direction, and the beams BC and BK are subjected to the deflection scanning on the arrow YC side along the main scanning direction.

The optical element groups 93 guide the laser light emitted from the laser light sources 91 and causes the laser light to pass through the predetermined optical path. According to the present embodiment, the optical element group 93 includes a first optical element group or an incident light optical element group 931, a second optical element group or a scanning optical element group 932, and a third optical element group or a synchronization optical element group 933. The incident light optical element group 931 causes the laser light output from the laser light source to be incident on the polygon mirror 92. The scanning optical element group 932 guides the laser light reflected by the reflecting surfaces 921 of the polygon mirror 92 and causes the laser light to be incident on the photosensitive drums 51. The synchronization optical element group 933 guides the laser light reflected by the reflecting surfaces 921 of the polygon mirror 92 at the predetermined positions to cause the laser light to be incident on the photodetectors 94.

The photodetectors 94 are beam detectors that detect laser light output from the laser light sources 91 and reflected by the polygon mirror 92. The photodetector 94 is also referred to as a BD sensor. The photodetector 94 includes, for example, a photodiode, a phototransistor, or other element that generates an electrical signal in response to light. If the laser beam is detected, the photodetectors 94 output beam detect signals (BD signals). The photodetectors 94 are disposed on the optical paths of the laser light reflected by the polygon mirror 92. The photodetectors 94 are provided on the process units 421 to 424, respectively. That is, the photodetectors 94 are provided for cyan, magenta, yellow, black, and the like, respectively. Therefore, the photodetectors 94 include the yellow photodetector 941, the magenta photodetector 942, the cyan photodetector 943, and the black photodetector 944.

In this case, the yellow photodetector 941 is disposed on the optical path of the laser light that is output from the yellow laser light source 911 and reflected by the polygon mirror 92. The magenta photodetector 942 is disposed on the optical path of the laser light that is output from the magenta laser light source 912 and reflected by the polygon mirror 92. The cyan photodetector 943 is disposed on the optical path of the laser light that is output from the cyan laser light source 913 and reflected by the polygon mirror 92. The black photodetector 944 is disposed on the optical path of the laser light that is output from the black laser light source 914 and reflected by the polygon mirror 92.

According to the present embodiment, the yellow photodetector 941 and the magenta photodetector 942 are provided at the same or substantially the same position in both of the main scanning direction and the sub-scanning direction. Also, the yellow photodetector 941 and the magenta photodetector 942 are provided in the optical scanning devices 43 in the posture in which the light detection surfaces face one direction of the main scanning direction. The cyan photodetector 943 and the black photodetector 944 are provided at the same or substantially the same position in both of the main scanning direction and the sub-scanning direction. Also, the cyan photodetector 943 and the black photodetector 944 are provided in the optical scanning devices 43 in the posture in which the light detection surfaces face one direction of the main scanning direction. However, the cyan photodetector 943 and the black photodetector 944 are provided at positions opposite to the yellow photodetector 941 and the magenta photodetector 942, centering on the polygon mirror 92. The cyan photodetector 943 and the black photodetector 944 face the direction opposite to the yellow photodetector 941 and the magenta photodetector 942 in the main scanning direction.

Subsequently, the incident light optical element group 931, the scanning optical element group 932, and the synchronization optical element group 933 are described. As described above, in the optical scanning device 43, the laser light sources 91 are provided for each process unit 42, and thus the incident light optical element group 931 are also provided for each process unit 42. That is, the laser light output from the yellow laser light source 911 is guided to the polygon mirror 92 by a yellow incident light optical element group 9311. The laser light output from the magenta laser light source 912 is guided to the polygon mirror 92 by a magenta incident light optical element group 9312. The laser light output from the cyan laser light source 913 is guided to the polygon mirror 92 by a cyan incident light optical element group 9313. The laser light output from the black laser light source 914 is guided to the polygon mirror 92 by a black incident light optical element group 9314.

As illustrated in FIG. 3, in the optical scanning device 43, the laser light sources 91 (911 to 914) and the incident light optical element groups 931 (9311 to 9314) are provided closer to one side in the main scanning direction than the polygon mirror 92. The yellow laser light source 911, the yellow incident light optical element group 9311, the magenta laser light source 912, and the magenta incident light optical element group 9312 are provided closer to one side in the sub-scanning direction than the polygon mirror 92. The cyan laser light source 913, the cyan incident light optical element group 9313, the black laser light source 914, and the black incident light optical element group 9314 are provided closer to the side opposite to the one side in the sub-scanning direction than the polygon mirror 92. Therefore, the incident light optical systems relating to yellow and magenta are provided on one side in the sub-scanning direction, and the incident light optical systems relating to cyan and black are provided on the side opposite to the one side in the sub-scanning direction. The incident light optical system corresponding to each color includes a laser light source corresponding to each color and an incident light optical element group corresponding to each color. The incident light optical system is referred to as a pre-deflection optical system. Two combinations selected from yellow, magenta, cyan, and black are not limited to the above combinations. For example, incident light optical systems relating to yellow and cyan may be provided on one side in the sub-scanning direction, and incident light optical systems relating to magenta and black may be provided on the side opposite to the one side in the sub-scanning direction.

Figure 4:
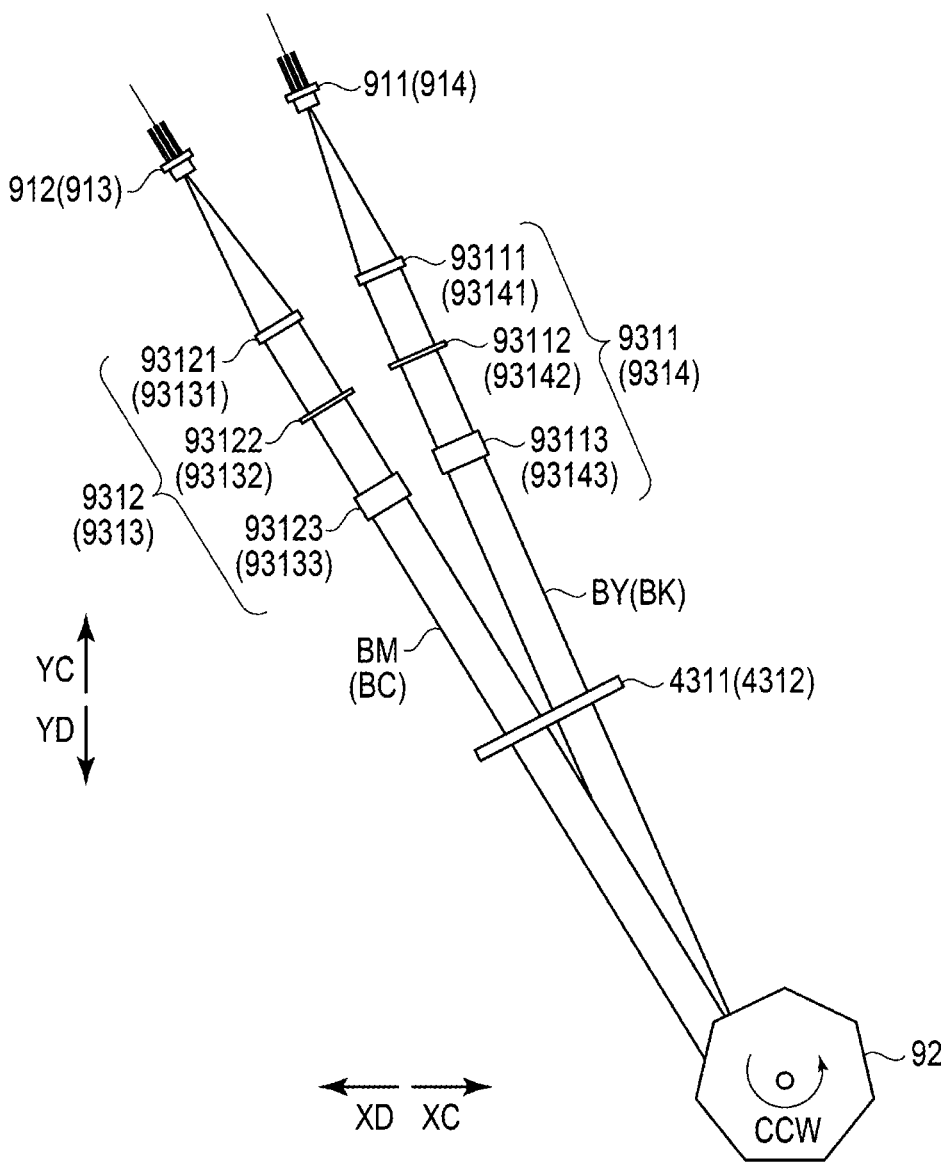
FIG. 4 is a schematic view illustrating an incident light optical system provided in the optical scanning device, as viewed from the upper side in the height direction.
Figure 5:
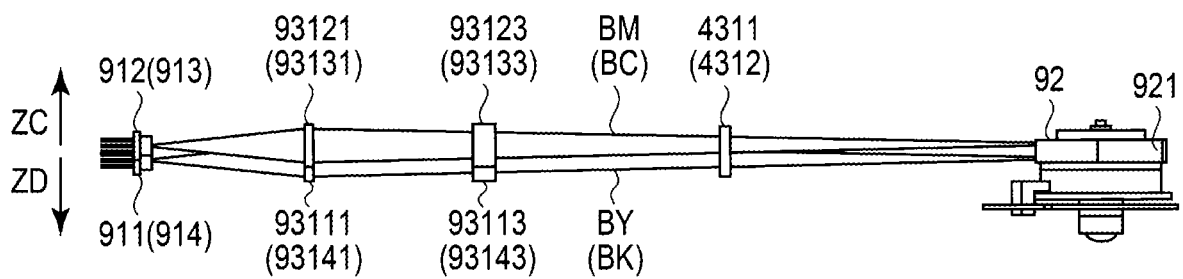
FIG. 5 is a schematic view illustrating the incident light optical system provided in the optical scanning device, as viewed in a different direction from FIG. 4.

FIGS. 4 and 5 are schematic views illustrating the yellow incident light optical element group 9311 and the magenta incident light optical element group 9312. Also in FIGS. 4 and 5, in the same manner as in FIG. 2, the height direction, the first direction, and the second direction are defined. FIG. 4 is a diagram illustrating the yellow incident light optical element group 9311 and the magenta incident light optical element group 9312, as viewed from the upper side in the height direction. FIG. 5 is a diagram illustrating the yellow incident light optical element group 9311 and the magenta incident light optical element group 9312, as viewed from a side on which the magenta incident light optical element group 9312 is positioned in the direction intersecting to the traveling direction of the laser light.

The yellow incident light optical element group 9311 includes a collimator lens 93111, an aperture 93112, and a cylinder lens 93113. The beam BY emitted from the yellow laser light source 911 passes through the collimator lens 93111, the aperture 93112, and the cylinder lens 93113 in this order and is incident on the polygon mirror 92. The collimator lens 93111 suppresses the diffusion of the beam BY. The collimator lens 93111 causes, for example, the beam BY to be parallel light. The aperture 93112 adjusts the shape of the beam BY on the surface intersecting to the traveling direction of the beam BY which passes through the collimator lens 93111. The cylinder lens 93113 adjusts the shape of the beam BY in the height direction which passes through the aperture 93112. Therefore, the spread of the beam BY in the height direction becomes smaller as it goes from the yellow laser light source 911 to the polygon mirror 92. That is, the spread of the beam BY in the height direction becomes smaller, while maintaining parallel light. The magenta incident light optical element group 9312 also has the same configuration as the yellow incident light optical element group 9311, and includes a collimator lens 93121, an aperture 93122, and a cylinder lens 93123.

As illustrated in FIG. 5, in the optical scanning device 43, the magenta laser light source 912 is provided on the upper side than the yellow laser light source 911 in the height direction. The magenta incident light optical element group 9312 is provided on the upper side of the yellow incident light optical element group 9311 in the height direction. Therefore, as described above, the beam BM guided from the magenta laser light source 912 to the polygon mirror 92 is incident on the reflecting surface 921 of the polygon mirror 92 on the upper side of the beam BY guided from the yellow laser light source 911 to the polygon mirror 92 in the height direction.

In the same configuration as the yellow incident light optical element group 9311, the cyan incident light optical element group 9313 includes a collimator lens 93131, an aperture 93132, and a cylinder lens 93133, and the black incident light optical element group 9314 includes a collimator lens 93141, an aperture 93142, and a cylinder lens 93143. Also, the same relationships as in FIGS. 4 and 5 are realized also in the incident light optical systems relating to cyan and black. At this point, the incident light optical system relating to cyan corresponds to the incident light optical system relating to magenta, and the incident light optical system relating to black corresponds to the incident light optical system relating to yellow. Therefore, the beam BC guided from the cyan laser light source 913 to the polygon mirror 92 is incident on the reflecting surface 921 of the polygon mirror 92 on the upper side of the beam BK guided from the black laser light source 914 to the polygon mirror 92 in the height direction.

As illustrated in FIG. 2, the scanning optical element group 932 guides the laser light reflected on the reflecting surfaces 921 of the polygon mirror 92 and causes the laser light to be incident on the photosensitive drums 51. The scanning optical element group 932 is provided for each process unit 42. That is, the scanning optical element groups 932 are provided for cyan, magenta, yellow, black, and the like, respectively. Therefore, the scanning optical element group 932 includes the yellow scanning optical element group 9321, the magenta scanning optical element group 9322, the cyan scanning optical element group 9323, and the black scanning optical element group 9324. The scanning optical element group 932 is referred to as a post-deflection optical system.

In this case, the yellow scanning optical element group 9321 causes the beam BY that is emitted from the yellow laser light source 911 and then reflected by the polygon mirror 92 to be incident on a yellow photosensitive drum 511 of the yellow process unit 421. The magenta scanning optical element group 9322 causes the beam BM that is emitted from the magenta laser light source 912 and then reflected by the polygon mirror 92 to be incident on a magenta photosensitive drum 512 of the magenta process unit 422. The cyan scanning optical element group 9323 causes the beam BC that is emitted from the cyan laser light source 913 and then reflected by the polygon mirror 92 to be incident on a cyan photosensitive drum 513 of the cyan process unit 423. The black scanning optical element group 9324 causes the beam BK that is emitted from the black laser light source 914 and then reflected by the polygon mirror 92 to be incident on a black photosensitive drum 514 of the black process unit 424.

The yellow scanning optical element group 9321 includes fθ lenses 93211 and 93212 and the bending mirror 93213. The beam BY deflected by the polygon mirror 92 rotating at a constant speed passes through the fθ lenses 93211 and 93212 so that the focused spot of the beam BY on the focal plane is scanned at a constant speed. The bending mirror 93213 reflects the beam BY. The bending mirror 93213 guides the beam BY to pass through one fθ lens 93211 to cause the beam BY to pass through the other fθ lens 93211. The disposition of the bending mirror 93213 is not particularly limited, and may be appropriately set in consideration of the configuration such as the disposition of the other optical elements. In the yellow scanning optical element group 9321 according to the present embodiment, three bending mirrors 93213 are disposed on the optical path between the fθ lenses 93211 and 93212. In this case, the beam BY is reflected three times, and guided from the fθ lens 93211 to the fθ lens 93212.

The magenta scanning optical element group 9322 also includes fθ lenses 93221 and 93222 and the bending mirror 93223 in the same manner as the yellow scanning optical element group 9321. However, two bending mirrors 93223 are disposed on the optical path between the fly lenses 93221 and 93222. In this case, the beam BM is reflected twice, and is guided from the fly lens 93221 to the fθ lens 93222. As illustrated in FIG. 2, according to the present embodiment, for the fθ lens 93211 and the fθ lens 93221, the same lens is used in the yellow scanning optical element group 9321 and the magenta scanning optical element group 9322. For the bending mirror 93213 and the bending mirror 93223 as well, the same bending mirror is used in the yellow scanning optical element group 9321 and the magenta scanning optical element group 9322.

The cyan scanning optical element group 9323 has the same configuration as the magenta scanning optical element group 9322 and includes fθ lenses 93231 and 93232 and the bending mirrors 93233. Two bending mirrors 93233 are disposed in the optical path between the fly lenses 93231 and 93232. The beam BC is reflected twice by the bending mirror 93233 and guided from the fθ lens 93231 to the fθ lens 93232. The black scanning optical element group 9324 has the same configuration as the yellow scanning optical element group 9321 and includes the fθ lenses 93241 and 93242 and the bending mirrors 93243. Three bending mirrors 93243 are disposed in the optical path between the fθ lenses 93241 and 93242. The beam BK is reflected three times by the bending mirrors 93243 and is guided from the fθ lens 93241 to the fθ lens 93242. As illustrated in FIG. 2, according to the present embodiment, for the fθ lens 93231 and the fθ lens 93241, the same lens is used in the cyan scanning optical element group 9323 and the black scanning optical element group 9324. For the bending mirror 93233 and the bending mirror 93243 as well, the same bending mirror is used in the cyan scanning optical element group 9323 and the black scanning optical element group 9324.

The optical scanning device 43 includes first cover glasses 4311 and 4312, second cover glasses 4321 to 4324, and third cover glasses 4331 to 4334. The first cover glasses 4311 and 4312 and the second cover glasses 4321 to 4324 suppress leakage of wind noise when the polygon mirror 92 rotates. The third cover glasses 4331 to 4334 cover emission ports through which the beams BY, BM, BC, and BK are emitted from the housing of the optical scanning device 43.

As illustrated in FIGS. 3 to 5, the first cover glass 4311 is provided on the optical paths between incident light optical systems relating to yellow and magenta and the polygon mirror 92, and the first cover glass 4312 is provided on the optical paths between incident light optical systems relating to cyan and black and the polygon mirror 92. According to the present embodiment, the first cover glass 4311 is provided between the cylinder lenses 93123 and 93113 and the polygon mirror 92, and the first cover glass 4312 is provided between the cylinder lenses 93133 and 93143 and the polygon mirror 92.

As illustrated in FIG. 3, the second cover glasses 4321 to 4324 are provided on the optical paths between the scanning optical element groups 9321 to 9324 and the polygon mirror 92. According to the present embodiment, the second cover glasses 4321 and 4322 are provided between the fθ lenses 93211 and 93221 and the polygon mirror 92, and the second cover glasses 4323 and 4324 are provided between the fθ lenses 93231 and 93241 and the polygon mirror 92.

As FIGS. 2 and 3, the third cover glasses 4331 to 4334 are provided on the optical paths between the scanning optical element groups 9321 to 9324 and the photosensitive drums 511 to 514. According to the present embodiment, the third cover glass 4331 is provided on the optical path between the fθ lens 93212 and the yellow photosensitive drum 511, and the third cover glass 4332 is provided on the optical path between the fθ lens 93222 and the magenta photosensitive drum 512. The third cover glass 4333 is provided on the optical path between the fθ lens 93232 and the cyan photosensitive drum 513, and the third cover glass 4334 is provided on the optical path between the fθ lens 93242 and the black photosensitive drum 514.

As illustrated in FIG. 3, the synchronization optical element group 933 includes a first synchronization optical element group 9331 and a second synchronization optical element group 9332. The first synchronization optical element group 9331 guides the beam BY and the beam BM that are subjected to the deflection scanning by the polygon mirror 92, to cause the beam BY to be incident on the yellow photodetector 941, and also the beam BM to be incident on the magenta photodetector 942. The second synchronization optical element group 9332 guides the beam BC and the beam BK that are subjected to the deflection scanning by the polygon mirror 92, to cause the beam BC to be incident on the cyan photodetector 943, and also the beam BK to be incident on the black photodetector 944. Therefore, the first synchronization optical element group 9331 is provided on the yellow photodetector 941 and the magenta photodetector 942 side in the sub-scanning direction, and the second synchronization optical element group 9332 is provided on the cyan photodetector 943 and the black photodetector 944 side in the sub-scanning direction.

In other words, the synchronization optical systems relating to yellow and magenta are provided on one side in the sub-scanning direction, and the synchronization optical systems relating to cyan and black are provided on a side opposite to the one side in the sub-scanning direction. The synchronization optical systems relating to yellow and magenta include the yellow photodetector 941, the magenta photodetector 942, and the first synchronization optical element group 9331. The synchronization optical systems relating to cyan and black include the cyan photodetector 943, the black photodetector 944, and the second synchronization optical element group 9332. The combinations of colors that are assigned to the synchronization optical system are not limited to the above combinations. The combinations can be appropriately set depending on the disposition of the incident light optical system of each color and the like.

The first synchronization optical element group 9331 includes the optical correction element 93311 and the bending mirrors 93312 to 93315. A bending mirror group is formed with the bending mirrors 93312 to 93315. The optical correction element 93311 causes the beams BY and BM guided by the bending mirrors 93312 to 93315 to be incident on the yellow photodetector 941 and the magenta photodetector 942. If the beams BY and BM passes through an end on one side (one end or a first end) of the area SA in the main scanning direction by being subjected to the deflection scanning by the polygon mirror 92, the bending mirror 93312 reflects the beams BY and BM and causes the beams BY and BM to advance toward the yellow photodetector 941 or the magenta photodetector 942. Therefore, the bending mirror 93312 is provided on a side where the incident light optical system is positioned in the main scanning direction.

If the beams BY and BM are subjected to deflection scanning by the polygon mirror 92 to pass through an end on a side opposite to the one side (the other end or a second end) of the area SA in the main scanning direction, the bending mirror (first bending mirror) 93313 reflects the beams BY and BM. Therefore, the bending mirror 93313 is provided on a side opposite to the side where the incident light optical system is positioned in the main scanning direction. According to the present embodiment, the bending mirror 93313 is provided near the yellow photodetector 941 and the magenta photodetector 942. Also, the bending mirror (second bending mirror) 93314 and the bending mirror (third bending mirror) 93315 reflect the beams BY and BM reflected by the bending mirror 93313 to cause the beams BY and BM to advance toward the yellow photodetector 941 or the magenta photodetector 942. At this point, the bending mirrors 93314 and 93315 are provided near the center in the main scanning direction. The bending mirror 93314 is provided outside the bending mirror 93315 in the sub-scanning direction. The bending mirror 93315 is provided between the bending mirror 93312 and the optical correction element 93311. The distance between the bending mirrors 93314 and 93315 is appropriately set.

If the beams BY and BM are subjected to the deflection scanning at a position (start position) of being reflected by the bending mirror 93312, if the beams BY and BM are illustrated to be (unfolded) in a state of being not reflected by the bending mirror 93312, the beams BY and BM are positioned at a virtual position A. Therefore, if the beams BY and BM pass through the bending mirror 93312, the beams BY and BM are incident on the bending mirror 93312 at the position of passing through the outside of the area SA. If the beams BY and BM are subjected to the deflection scanning at the position (end position) of being reflected by the bending mirror 93313, if the beams BY and BM are illustrated to be (unfolded) in a state of being not reflected by the bending mirror 93313, the beams BY and BM are positioned at a virtual position B. Therefore, if the beams BY and BM pass through the bending mirror 93313, the beams BY and BM are incident on the bending mirror 93313 at the position of passing through the outside of the area SA.

In the same manner as the first synchronization optical element group 9331, the second synchronization optical element group 9332 also includes the optical correction element 93321 and the bending mirrors 93322 to 93325. However, the second synchronization optical element group 9332 is disposed at the position of being point-symmetrical or substantially point-symmetrical to the first synchronization optical element group with the polygon mirror 92 as the center. Therefore, if the beams BC and BK are subjected to the deflection scanning at the position (start position) of being reflected by the bending mirror 93322, if the beams BC and BK are illustrated to be (unfolded) in a state of being not reflected by the bending mirror 93322, the beams BC and BK are positioned at a virtual position C. Therefore, if the beams BC and BK pass through the bending mirror 93322, the beams BC and BK are incident on the bending mirror 93322 at the position of passing through the outside of the area SB. If the beams BY and BM are subjected to the deflection scanning at the position (end position) of being reflected by the bending mirror 93323, if the beams BC and BK are illustrated to be (unfolded) in a state of being not reflected by the bending mirror 93323, the beams BC and BK are positioned at a virtual position D. Therefore, if the beams BC and BK pass through the bending mirror 93323, the beams BC and BK are incident on the bending mirror 93323 at the position of passing through the outside of the area SB.

Figure 6:
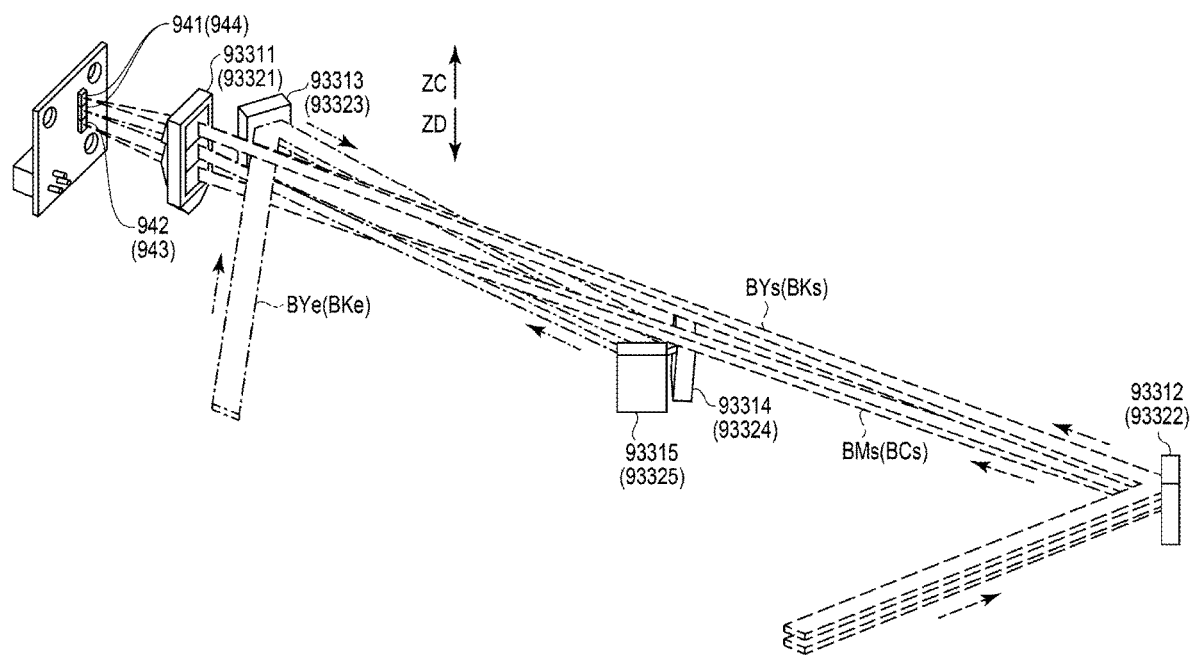
FIG. 6 is a schematic perspective view illustrating a synchronization optical system provided in the optical scanning device, as viewed from the upper side in the height direction.
Figure 7:
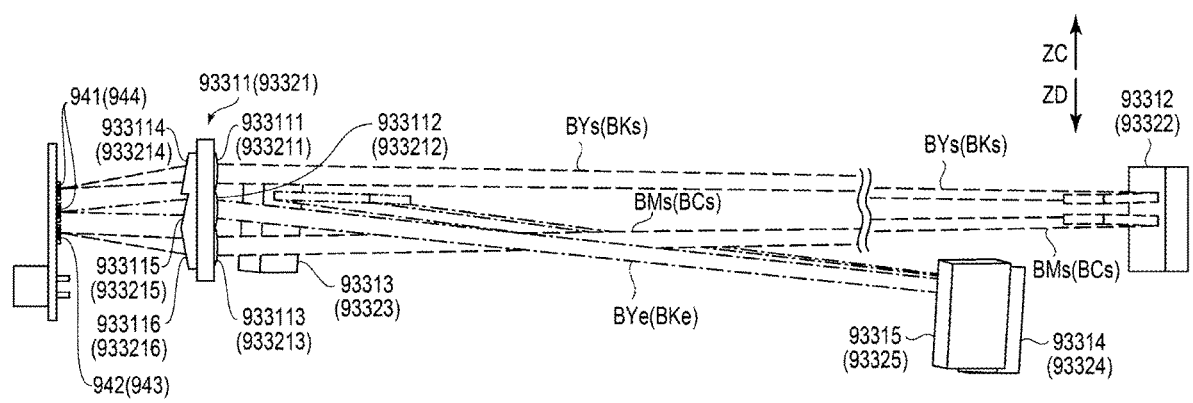
FIG. 7 is a schematic view illustrating a positional relationship in which a beam applied at a start position or an end position of deflection scanning is incident on the synchronization optical system provided in the optical scanning device, as viewed from one side in a sub-scanning direction.

Subsequently, paths of the beams in the synchronization optical system are described. FIGS. 6 and 7 are schematic views illustrating paths of beams in the synchronization optical systems relating to yellow and magenta. Also in FIGS. 6 and 7, height directions, first directions, and second directions are defined in the same manner as in FIGS. 2 and 3. FIG. 6 is a schematic perspective view illustrating paths of beams in the synchronization optical system relating to yellow and magenta, as viewed from the upper side in the height direction, and FIG. 7 is a schematic view illustrating paths of beams in the synchronization optical systems relating to yellow and magenta as viewed from the polygon mirror 92 side (side indicated by an arrow ZD) in the sub-scanning direction.

As described above, in the optical scanning device 43, the beams BY and BM are subjected to the deflection scanning to the arrow YD side in the main scanning direction by the polygon mirror 92. In the deflection scanning by the polygon mirror 92, at the position (start position) where the beams BY and BM are reflected by the bending mirror 93312, beams BYs and BMs (illustrated with broken lines) are reflected by the bending mirror 93312 and incident on the yellow photodetector 941 and the magenta photodetector 942. Thereafter, if the deflection scanning by the polygon mirror 92 continues so that if the beam BY is deflected to the position (end position) of being reflected by the bending mirror 93313, a beam BYe (illustrated with the alternate long and short dash line or dash-dot line) is reflected by the bending mirrors 93313 to 93315 and incident on the yellow photodetector 941. However, the yellow photodetector 941 and the magenta photodetector 942 respectively detect the beams BYs and BMs at the start position of the deflection scanning, and the yellow photodetector 941 detects the beam BYe at the end position of the deflection scanning.

Figure 8:
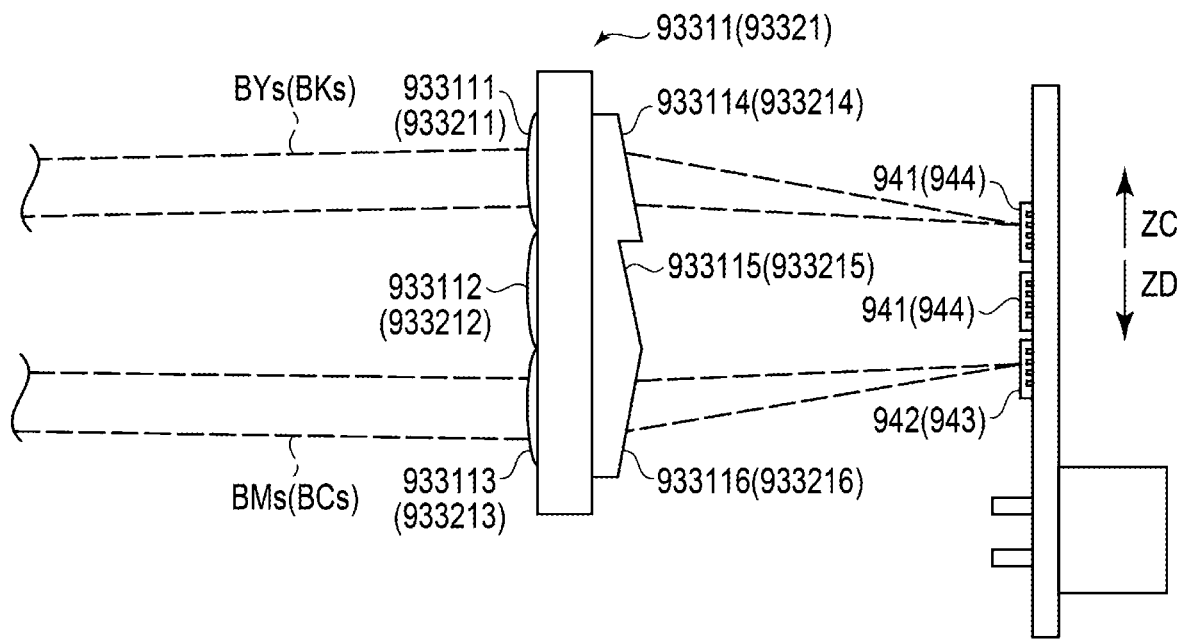
FIG. 8 is a schematic view illustrating a positional relationship in which beams at a start position are incident on an optical correction element and photodetectors provided in the optical scanning device, as viewed from one side in the main scanning direction.
Figure 9:
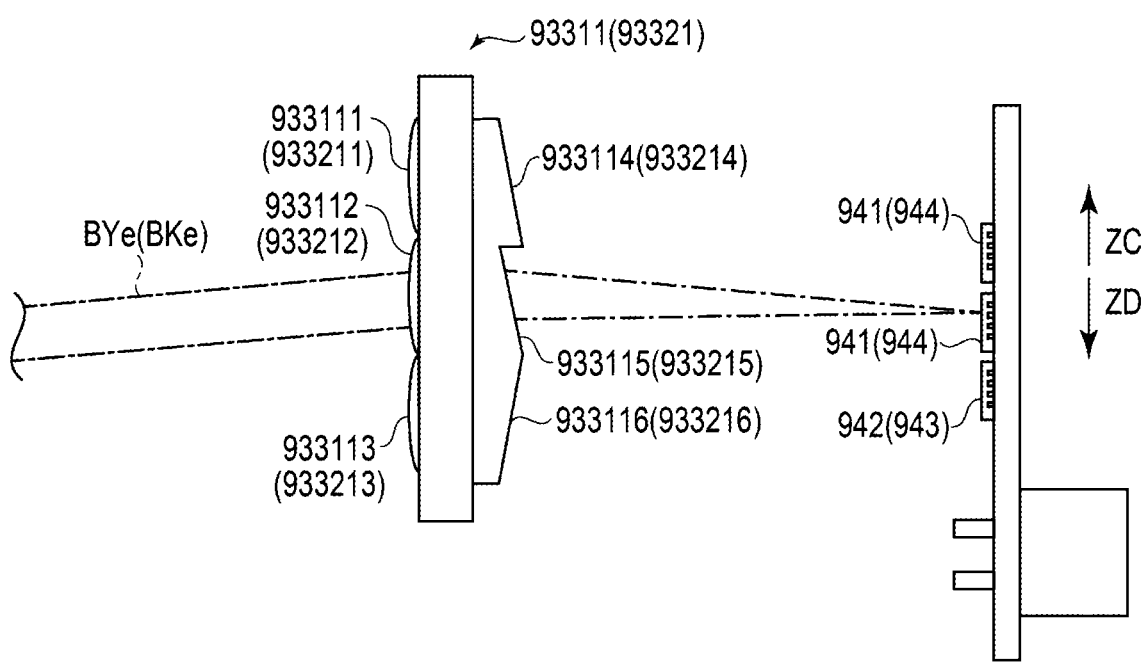
FIG. 9 is a schematic view illustrating a positional relationship in which a beam applied at the end position of deflection scanning is incident on the optical correction element and the photodetectors provided in the optical scanning device, as viewed from one side in the main scanning direction.

FIG. 8 illustrates a positional relationship in which the beams BYs and BMs are incident on the yellow photodetector 941 and the magenta photodetector 942 at the start position of the deflection scanning by the polygon mirror 92. FIG. 9 illustrates a positional relationship in which the beam BYe is incident on the yellow photodetector 941 at the end position of the deflection scanning by the polygon mirror 92. Also in FIGS. 8 and 9, height directions, first directions, and second directions are defined in the same manner as in FIGS. 2 and 3.

As illustrated in FIGS. 8 and 9, in the optical scanning device 43, the yellow photodetector 941 and the magenta photodetector 942 are disposed side by side in the height direction. In order to respectively detect the beams BYs and BMs at the start position of the deflection scanning and the beam BYe at the end position of the deflection scanning, two yellow photodetectors 941 and one magenta photodetector 942 are installed on the same substrate. In the examples of FIGS. 8 and 9, the yellow photodetector 941 that detects the beam BYs at the start position of the deflection scanning, the yellow photodetector 941 that detects the beam BYe at the end position of the deflection scanning, and the magenta photodetector 942 that detects the beam BMs at the start position of the deflection scanning are installed on the same substrate in an order from the upper side in the height direction.

As illustrated in FIGS. 8 and 9, the optical correction element 93311 includes cylindrical surfaces 933111 to 933113, and prism surfaces 933114 to 933116. In the optical correction element 93311, the cylindrical surfaces 933111 to 933113 face the prism surfaces 933114 to 933116. Also, the optical correction element 93311 is provided at the posture in which the prism surfaces 933114 to 933116 face the yellow photodetector 941 and the magenta photodetector 942. At this point, as illustrated in FIG. 7, the cylindrical surfaces 933111 to 933113 face the bending mirror 93312 side in the main scanning direction.

The cylindrical surfaces 933111 to 933113 converge beams in one direction of a cross section intersecting the traveling direction of the incident beams. According to the present embodiment, the cylindrical surfaces 933111 to 933113 are respectively installed in the sub-scanning direction and are formed in a convex shape toward the bending mirror 93312 side in the main scanning direction. Each of the cylindrical surfaces 933111 to 933113 functions as, for example, a cylindrical lens. Therefore, if the beams pass through the cylindrical surfaces 933111 to 933113, the beams are converged in the sub-scanning direction. The prism surfaces 933114 to 933116 are formed in a plane shape facing a predetermined direction and change the traveling direction by refracting the incident beams.

Figure 10:
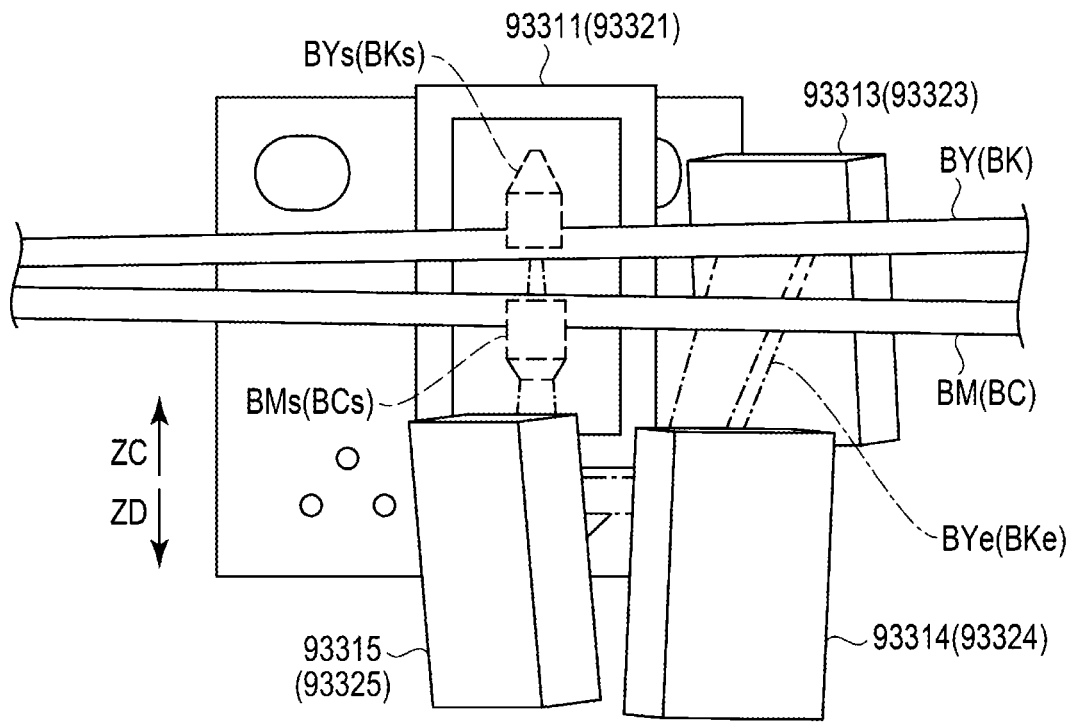
FIG. 10 is a schematic view illustrating a positional relationship of the synchronization optical system illustrated in FIG. 7 as viewed from one side in the main scanning direction.

FIG. 10 is a schematic view illustrating the optical correction element 93311 in FIGS. 6 and 7, as viewed from the bending mirror 93312 side in the main scanning direction. As illustrated in FIG. 10, the beam BYe is reflected toward the lower side than the bending mirror 93313 in the height direction, and also is reflected toward the upper side than the bending mirrors 93314 and 93315 in the height direction. Accordingly, without intersecting to the beams BY and BM that pass through the area SA, the beam BYe is guided to the cylindrical surface 933112 of the optical correction element 93311. The optical path difference between the beam BYe and the beams BYs and BMs occurring due to the guidance of the beam BYe as described above is corrected by adjusting the prism surface 933115. Accordingly, there is substantially no difference between the optical path lengths of the beams BYs and BMs and the optical path length of the beam BYe.

With such a configuration, in the synchronization optical systems relating to yellow and magenta, the beam BYs is incident on the cylindrical surface 933111 by being reflected once by the bending mirror 93312 and passes through the prism surface 933114, so as to be incident on the yellow photodetector 941 disposed on the uppermost side in the height direction and converges on the detection surface of the yellow photodetector 941. In the same manner, the beam BMs is incident on the cylindrical surface 933113 by being reflected once by the bending mirror 93312 and passes through the prism surface 933116, so as to be incident on the magenta photodetector 942 disposed on the lowermost side in the height direction and converges on the detection surface of the magenta photodetector 942. The beam BYe is incident on the cylindrical surface 933112 by being reflected three times by the bending mirrors 93313 to 93315 and passes through the prism surface 933115, so as to be incident on the yellow photodetector 941 disposed between the yellow photodetector 941 and the magenta photodetector 942 in the height direction and converges on the detection surface of the magenta photodetector 942. In this manner, the detection surfaces of the photodetectors 941 and 942 become focal points. In this case, all of the beams BYs, BMs, and BYe are reflected an odd number of times to be incident on the corresponding photodetector 94. The number of reflections of the beams BYs, BMs, and BYe is not limited to this, but the number of reflections of the beams BYs, BMs, and BYe is preferably any one of an odd number in entirely or an even number in entirely.

In this case, as illustrated in FIG. 3, if the synchronization optical systems relating to yellow and magenta are viewed from one side in the height direction, the trajectory of the beam BYs, the trajectory of the beam BMs, and the trajectory of the beam BYe are overlapped with each other between the bending mirror 93312 and the optical correction element 93311. As illustrated in FIG. 7, the trajectory of the beam BMs faces the lower side in the height direction toward the optical correction element 93311. Meanwhile, the trajectory of the beam BYe faces the upper side in the height direction from the bending mirror 93315 toward the optical correction element 93311. Therefore, the trajectory of the beam BMs intersects to the trajectory of the beam BYe at a predetermined position.

The synchronization optical system relating to cyan and black have the same configuration as the synchronization optical system relating to yellow and magenta. Therefore, the optical correction element 93321 includes cylindrical surfaces 933211 to 933213, and the prism surfaces 933214 to 933216. The beams BC and BK are guided in the same manner as the synchronization optical system relating to yellow and magenta. Therefore, the cyan photodetector 943 and the black photodetector 944 respectively detect the beams BCs and BKs at the start position of the deflection scanning, and the black photodetector 944 detects a beam BKe at the end position of the deflection scanning. However, as described above, the synchronization optical systems relating to cyan and black are provided at a position point-symmetrical or substantially point-symmetrical to the synchronization optical system relating to yellow and magenta with the polygon mirror 92 as the center and are subjected to the deflection scanning on the arrow YC side in the main scanning direction. Accordingly, the beams BCs, BKs, and BKe are incident on the cyan photodetector 943 or the black photodetector 944, from the arrow YD side in the main scanning direction.

In such an optical scanning device 43, in the first synchronization optical element group 9331, the beam BYs applied to one end as the image writing start position is detected by the photodetector 941 and the beam BMs applied to one end as the image writing start position is detected by the photodetector 942, so that image writing start time can be detected. Also, the image writing end time can be detected by detecting the beam BYe applied to the other end as the image writing end position by the photodetector 941. Based on these detection results, the image forming device 1 can calculate image writing time with respect to yellow and magenta.

In the same manner, in the second synchronization optical element group 9332, image writing start time can be detected by detecting the beam BKs applied to one end as the image writing start position with the photodetector 944 and detecting the beam BCs applied to one end as the image writing start position with the photodetector 943. Also, the image writing end time can be detected by detecting the beam BKe applied to the other end as the image writing end position with the photodetector 944. Based on these detection results, the image forming device 1 can calculate image writing time with respect to cyan and black.

The image forming device 1 can predict a degree of deviation of the formed image by comparing the image writing time with respect to yellow and magenta and the image writing time with respect to cyan and black. In one example, the image forming device 1 synchronizes the plurality of incident light optical systems by adjusting the timing of the beams emitted from the plurality of incident light optical systems based on the degree of the deviation of the images. In another example, the image forming device 1 adjusts the timing of the conveyance of the recording medium and the conveyance speed of the recording medium in the image forming unit 19 based on the degree of the deviation of the image.

At this point, as illustrated in FIGS. 8 and 9, the photodetectors 941 and 942 (the photodetectors 943 and 944) are disposed side by side in the height direction (a vertically stacked arrangement). Therefore, in one example, even if the position of the photodetector is changed due to the thermal expansion of the optical scanning device 43 (the optical scanning device 43 changes at the same magnification with the temperature change), the photodetectors 941 and 942 (the photodetectors 943 and 944) move in the same manner, and thus the time from the image writing start to the image writing end does not change substantially. In another example, even if the optical path length in the synchronization optical system changes due to the thermal expansion of the optical scanning device 43, the time from the image writing start to the image writing end does not change substantially. Therefore, the change of the time from the image writing start to the image writing end due to the cause other than the fluctuations of the position of the photodetector can be measured. Examples of the cause include curvature fluctuations due to temperature changes of the fθ lens and wavelength fluctuations of the laser diode.

In the optical scanning device 43 according to the present embodiment as described above, the beam applied to an end on one side (one end) in the main scanning direction is incident on the photodetector 94 from a side on which the beam applied to the other end on a side opposite to the one end is incident on the photodetector 94. That is, the beam applied to one end is incident on the photodetector 94 from the same side as the beam applied to the other end. Therefore, the detection error due to the different incident direction on the photodetector 94 can be suppressed.

If the optical scanning device 43 according to the present embodiment is viewed from one direction of the height directions, the trajectory of the beam applied to one end toward the photodetector 94 preferably includes a portion overlapped with the trajectory of the beam applied to the other end toward the photodetector 94 (i.e., when as viewed from one direction of a height direction (ZC or ZD) intersecting to the main scanning direction, a first portion of a first trajectory of the beam deflected toward the first end (the portion of BYs between bending mirror 93312 and optical correction element 93311) and a second portion of a second trajectory of the beam deflected toward the second end (the portion of BYe between bending mirror 93315 and the optical correction element 93311) at least partially overlap before reaching the photodetector 94). According to the adjustment of the trajectories of the beams, for example, the trajectory of the beam applied to one end can be caused to be parallel or substantially parallel to the trajectory of the beam applied to the other end. Accordingly, the optical scanning device 43 can appropriately detect the beams.

In the optical scanning device 43 according to the present embodiment, the beam applied to the end position (the other end) is preferably focused at the focal point of the beam applied to the start position (one end). The photodetector 94 is preferably provided at the focal point and also detects both of the beam applied to one end and the beam applied to the other end. By disposing the photodetector 94 in this manner, for example, even if the detection position fluctuates due to the thermal expansion or the like, the beam can be appropriately detected as described above.

In the optical scanning device 43 according to the present embodiment, the optical element group 93 is preferably provided to be deviated in the height direction (e.g., vertically offset or spaced) from the image area through which the beam is subjected to deflection scanning and passes.

Accordingly, the optical element group 93 can be compactly provided in the optical scanning device 43 without interfering with the beam passing through the image area. As a result, the optical scanning device 43 can appropriately detect the beam.

In the optical scanning device 43 of the present embodiment, the optical element group 93 preferably includes the plurality of bending mirrors 93312 to 93315 that reflect the beam and guide the beam to the photodetector 94. Also, the number of times of the reflection of the beam applied to one end by the plurality of bending mirrors is preferably identical to the number of reflection of the beam applied to the other end by the plurality of bending mirrors in terms of oddness or evenness. By adjusting the number of reflections in this way, even if the image is inverted due to the reflection of the plurality of folded mirrors, the direction of the image of the beam applied to one end and the direction of the image of the beam applied to the other end can be caused to be identical to each other.

In the optical scanning devices 43 according to the present embodiment, the bending mirrors 93313 to 93315 (93323 to 93325) of the bending mirror group that reflects the beam applied to the other end are provided at the close positions in the sub-scanning direction. By disposing the bending mirrors 93313 to 93315 (93323 to 93325) in this manner, the influence on the detection of the beam due to thermal expansion (linear expansion) of the optical scanning device 43 in the sub-scanning direction can be suppressed.

In the optical scanning device 43 of the present embodiment, the beam applied to the end position (the other end) is preferably deviated to one side in the height direction toward the photodetector 94, after being reflected by the bending mirror 93313 (93323) (e.g., the beam deflected toward the second end is reflected by the bending mirror group (bending mirrors 93313. 93314, and 93315) such that a trajectory of the beam is angled in a height direction between the bending mirror group and the photodetector). Accordingly, without interfering with the beam passing through the image area, the optical element group 93 can be compactly provided in the optical scanning device 43. Accordingly, the optical scanning device 43 can appropriately detect the beam.

(Modification)

Figure 11:
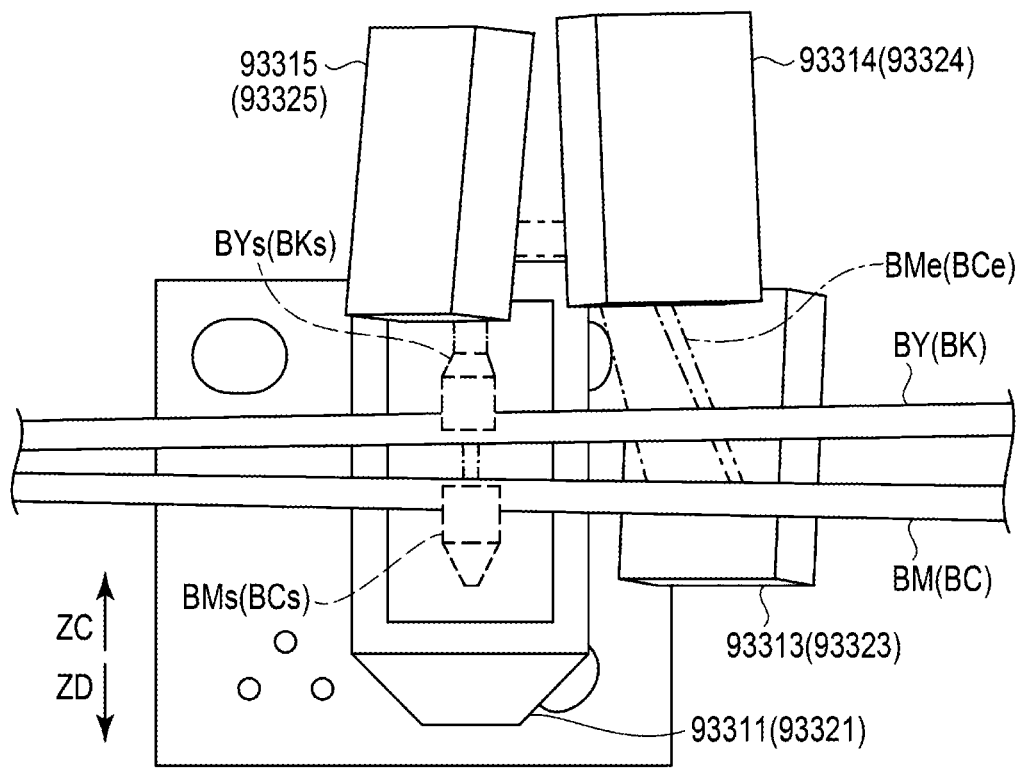
FIG. 11 is a schematic view illustrating a positional relationship of the synchronization optical system disposed differently from FIG. 10, as viewed from one side in the main scanning direction.

In a certain modification, the disposition of the bending mirrors 93313 to 93315 (93323 to 93325) may be different. FIG. 11 is a schematic view illustrating the positional relationship of the synchronization optical system disposed differently from FIG. 10, as viewed from one side in the main scanning direction. In this example, a beam BMe (BCe) is reflected toward the upper side in the height direction by the bending mirror 93313 (93323) and reflected toward the lower side of the bending mirrors 93314 and 93315 (93324 and 93325) in the height direction. Accordingly, without intersecting to the beams BY and BM (BK and BC) passing through the area SA, the beam BMe (BCe) is guided to the cylindrical surface 933112 (933212) of the optical correction element 93311.

In a certain modification, the beam applied to the start position of the deflection scanning may be reflected three times to be detected by the photodetector 94, and also the beam applied to the end position of the deflection scanning is reflected once to be detected by the photodetector 94. That is, the configuration until the beam applied to the end position of the deflection scanning in the above embodiment is guided to the corresponding photodetector may be used as the configuration until the beam applied to the start position of the deflection scanning in the present modification is guided to the corresponding photodetector. In this case, the configuration until the beam applied to the start position of the deflection scanning in the above embodiment is guided to the corresponding photodetector is used as the configuration until the beam applied to the end position of the deflection scanning of the present modification is guided to the corresponding photodetector.

In a certain modification, all of the beams BYs, BYe, and BMs may be detected by the single photodetector 94, and also all of the beams BKs, BKe, and BCs may be detected by the single photodetector 94. By detecting all of the beams BYs, BYe, and BMs by the single photodetector 94, a detection error due to separate disposition of the photodetectors 94 can be further suppressed.

In a certain modification, without detecting both of the beams BYs and BMs (BKs and BCs) applied to the start position of the deflection scanning, any one of the beams may be detected. In this case, the photodetector 94 may monitor the time from the image writing start to the image writing end, for example, by detecting the beam BYs and the beam BYe. The image writing start position of the beam BY is determined, for example, based on the color deviation correction amount measured by a predetermined method in advance. Further, in a certain modification, in addition to the beams BYs, BYe, and BMs (BCs, BCe, and BKs), the beam BMe (BKe) may be detected by the photodetector 94. In this case, both of the image writing start time and the image writing end time are detected with two types of the beams BY and BM (BC and BK).

According to at least one of these embodiments, the optical scanning device that is provided in the image forming device and deflects the light in the main scanning direction along the rotation axis of the photoconductor includes a light source, a photodetector, an optical element group, and a polygon mirror. The light source emits the laser light. The photodetector detects the beam formed with laser light. The optical element group guides the beam to the photodetector. The polygon mirror performs the deflection scanning on the beam from one end in one direction of the main scanning directions to the other end on a side opposite to the one end. The beam applied to one end is incident on the photodetector from a side on which the beam applied to the other end is incident on the photodetector. Accordingly, the optical scanning device can appropriately detect the beam.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An optical scanning device that is provided in an image forming device and is used for deflecting light in a main scanning direction along a rotation axis of a photoconductor, the device comprising:
   a light source configured to emit laser light;
   a photodetector configured to detect a beam formed with the laser light;
   an optical element group configured to guide the beam to the photodetector; and a polygon mirror configured to perform deflection scanning on the beam, which deflects the beam from a first end in one direction of the main scanning direction to a second end on a side opposite to the first end in the main scanning direction, wherein the beam is incident on the same side of the photodetector when the beam is deflected toward the first end and the second end by the polygon mirror, wherein the optical element group includes a plurality of bending mirrors configured to reflect the beam the same number of times, in terms of oddness or evenness, when the beam is deflected toward the first end as when the beam is deflected toward the second end.

2. The optical scanning device of claim 1, wherein the beam deflected toward the second end is focused at a focal point of the beam applied to the second end, and wherein the photodetector is positioned at the focal point and configured to detect both the beam deflected toward the first end and the second end.

3. The optical scanning device of claim 1, wherein, when as viewed from one direction of a height direction intersecting the main scanning direction, a first portion of a first trajectory of the beam deflected toward the first end and a second portion of a second trajectory of the beam deflected toward the second end at least partially overlap before reaching the photodetector.

4. The optical scanning device of claim 3, wherein the optical element group is vertically offset from an image area between the first end and the second end through which the beam subjected to deflection scanning passes.

5. An optical scanning device that is provided in an image forming device and is used for deflecting light in a main scanning direction along a rotation axis of a photoconductor, the device comprising:
a light source configured to emit laser light;
a photodetector configured to detect a beam formed with the laser light;
an optical element group configured to guide the beam to the photodetector; and
a polygon mirror configured to perform deflection scanning on the beam, which deflects the beam from a first end in one direction of the main scanning direction to a second end on a side opposite to the first end in the main scanning direction,
wherein the beam is incident on the same side of the photodetector when the beam is deflected toward the first end and the second end by the polygon mirror
wherein, when as viewed from one direction of a height direction intersecting the main scanning direction, a first portion of a first trajectory of the beam deflected toward the first end and a second portion of a second trajectory of the beam deflected toward the second end at least partially overlap before reaching the photodetector,
wherein the optical element group includes a plurality of bending mirrors that reflect the beam and guide the beam to the photodetector, and
wherein a first number of times the beam deflected toward the first end is reflected by the plurality of bending mirrors is the same in terms of oddness or evenness to a second number of times he beam deflected toward the second end is reflected by the plurality of bending mirrors.

6. The optical scanning device of claim 5, wherein the plurality of bending mirrors include (i) a first bending mirror group including one or more first bending mirrors that reflect the beam provided to the first end to the photoreceptor and (ii) a second bending mirror group including one or more second bending mirrors that reflect the beam provided to the second end to the photoreceptor.

7. The optical scanning device of claim 6, wherein the one or more second bending mirrors include at least two bending mirrors positioned adjacent one another in a sub-scanning direction intersecting the main scanning direction and the height direction.

8. The optical scanning device of claim 6, wherein the beam deflected toward the second end is reflected by the second bending mirror group such that a trajectory of the beam is angled in the height direction between the second bending mirror group and the photodetector.

9. The optical scanning device of claim 6, wherein each of the first bending mirror group and the second bending mirror group includes an odd number of bending mirrors.

10. The optical scanning device of claim 9, wherein the first bending mirror group include a single bending mirror and the second bending mirror group includes three bending mirrors.

11. The optical scanning device of claim 10, wherein the three bending mirrors of the second bending mirror group includes:
a first bending mirror positioned to reflect the beam deflected by the polygon mirror toward the second end, wherein the first bending mirror is positioned to reflect the beam toward the first end in the main scanning direction;
a second bending mirror positioned to reflect the beam reflected by the first bending mirror toward the polygon mirror in a sub-scanning direction; and
a third bending mirror positioned to reflect the beam reflected by the second bending mirror toward the second end in the main scanning direction and to the photodetector positioned proximate the second end.

12. The optical scanning device of claim 1, wherein the light source includes a first light source configured to provide a first beam and a second light source different from the first light source and configured to provide a second beam, the first beam subjected to deflection scanning in one direction in the main scanning direction by the polygon mirror, and the second beam subjected to deflection scanning in a direction opposite to the one direction in the main scanning direction in response to the deflection scanning of the first beam formed with the first light source.

13. An image forming device comprising:
a photosensitive drum; and
an optical scanning device configured to irradiate the photosensitive drum with a light beam, the optical scanning device including:
a polygon mirror;
a photodetector;
a light source configured to emit the light beam;
a first optical element group positioned to (i) receive the light beam from the light source and (ii) provide the light beam to the polygon mirror, wherein the polygon mirror is configured to rotate and deflect the light beam in a main scanning direction between a first end of the main scanning direction and an opposing second end of the main scanning direction, and wherein an image area is formed between the first end and the opposing second end;
a second optical element group positioned to (i) receive the light beam deflected within the image area by the polygon mirror and (ii) provide the light beam to the photosensitive drum; and a third optical element group positioned to (i) receive the light beam deflected toward the first end and the opposing second end by the polygon mirror and (ii) provide the light beam the photodetector.

14. The image forming device of claim 13, wherein the light beam is incident on the same side of the photodetector when the light beam is deflected toward the first end and the opposing second end by the polygon mirror.

15. The image forming device of claim 13, wherein, when as viewed from one direction of a height direction intersecting the main scanning direction, a first portion of a first trajectory of the light beam deflected toward the first end and a second portion of a second trajectory of the light beam deflected toward the opposing second end at least partially overlap before reaching the photodetector.

16. The image forming device of claim 13, wherein the third optical element group is vertically offset from the image area between the first end and the opposing second end through which the light beam passes.

17. The image forming device of claim 13, wherein the third optical element group includes a plurality of mirrors, wherein the plurality of mirrors include (i) a first mirror group including one or more first mirrors positioned to reflect the light beam deflected toward the first end to the photoreceptor and (ii) a second mirror group including one or more second mirrors positioned to reflect the light beam deflected toward the opposing second end to the photoreceptor.

18. The image forming device of claim 17, wherein the light beam deflected toward the opposing second end is reflected by the second mirror group such that a trajectory of the light beam is angled in a height direction between the second mirror group and the photodetector.

19. The image forming device of claim 17, wherein the first mirror group include a single mirror and the second mirror group includes three mirrors.

20. The image forming device of claim 19, wherein the three mirrors of the second mirror group includes:
    a first mirror positioned to reflect the light beam deflected by the polygon mirror toward the opposing second end, wherein the first mirror is positioned to reflect the light beam toward the first end in the main scanning direction;
    a second mirror positioned to reflect the light beam reflected by the first mirror toward the polygon mirror in a sub-scanning direction; and
    a third mirror positioned to reflect the light beam reflected by the second mirror toward the opposing second end in the main scanning direction and to the photodetector positioned proximate the opposing second end.

* * * * *